United States Patent
Chen et al.

(10) Patent No.: US 10,735,155 B2
(45) Date of Patent: Aug. 4, 2020

(54) RATE MATCHING AROUND REFERENCE SIGNALS IN WIRELESS COMMUNICATIONS

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/858,993

(22) Filed: Sep. 18, 2015

(65) Prior Publication Data

US 2016/0127095 A1 May 5, 2016

Related U.S. Application Data

(60) Provisional application No. 62/074,490, filed on Nov. 3, 2014.

(51) Int. Cl.
*H04W 28/20* (2009.01)
*H04L 5/00* (2006.01)
(Continued)

(52) U.S. Cl.
CPC .......... *H04L 5/0048* (2013.01); *H04L 5/0053* (2013.01); *H04L 5/0057* (2013.01);
(Continued)

(58) Field of Classification Search
None
See application file for complete search history.

(56) References Cited

U.S. PATENT DOCUMENTS 8,948,076 B2 * 2/2015 Kim ...................... H04W 52/54
370/315
9,130,725 B2 9/2015 Gaal et al.
(Continued)

FOREIGN PATENT DOCUMENTS

CN 101924610 A 12/2010
CN 103703833 A 4/2014
(Continued)

OTHER PUBLICATIONS

3GPP DRAFT; R1-143499, 3rd Generation Partnership Project (3GPP), Mobile Competence Centre ; 650, Route Des Lucioles ; F-06921 Sophia-Antipolis Cedex ; France vol. RAN WG1, No. Dresden, Germany; Aug. 18, 2014-Aug. 22, 2014 Aug. 20, 2014 (Aug. 20, 2014), XP050815832, Retrieved from the Internet: URL:http://www.3gpp.org/ftp/tsg_ran/WG1_RL1/TSGR1_78/Docs/ [retrieved on Aug. 20, 2014]. (6 pages).
(Continued)

Primary Examiner — Noel R Beharry
Assistant Examiner — Pamit Kaur
(74) Attorney, Agent, or Firm — Nerrie M Zohn; Arent Fox LLP

(57) ABSTRACT

Various aspects described herein relate to rate matching around reference signaling. A discovery reference signal (DRS) configuration is received that identifies first resources related to non-zero power reference signals for DRS transmitted by a cell over a first bandwidth and second resources related to zero power reference signals for the DRS over a second bandwidth. The first bandwidth can be less than or equal to the second bandwidth. At least one channel can be received from the cell along with an instance of the non-zero power reference signals and the zero power reference signals. Rate matching can be performed for the at least one
(Continued)

channel around the second resources over the second bandwidth.

22 Claims, 9 Drawing Sheets

(51) Int. Cl.
*H04W 48/16* (2009.01)
*H04W 24/02* (2009.01)
*H04W 28/22* (2009.01)
*H04L 1/18* (2006.01)

(52) U.S. Cl.
CPC ........... *H04W 24/02* (2013.01); *H04W 28/22* (2013.01); *H04W 48/16* (2013.01); *H04L 1/1841* (2013.01); *H04L 5/001* (2013.01); *H04L 5/0064* (2013.01)

(56) References Cited

U.S. PATENT DOCUMENTS

| | | | |
|---|---|---|---|
| 9,456,372 B2* | 9/2016 | Lee | H04W 24/10 |
| 2010/0273506 A1* | 10/2010 | Stern-Berkowitz | G01S 5/0009 |
| | | | 455/456.1 |
| 2013/0244664 A1 | 9/2013 | Song et al. | |
| 2014/0036796 A1* | 2/2014 | Etemad | H04W 24/04 |
| | | | 370/329 |
| 2014/0286232 A1* | 9/2014 | Kim | H04B 7/0413 |
| | | | 370/315 |
| 2014/0301293 A1* | 10/2014 | Geirhofer | H04B 7/0626 |
| | | | 370/329 |
| 2014/0321370 A1* | 10/2014 | Chen | H04L 1/0038 |
| | | | 370/329 |
| 2015/0092655 A1* | 4/2015 | Liao | H04J 11/005 |
| | | | 370/312 |
| 2015/0092768 A1* | 4/2015 | Ng | H04W 48/16 |
| | | | 370/350 |
| 2015/0215856 A1* | 7/2015 | Kim | H04W 48/16 |
| | | | 370/252 |
| 2015/0358966 A1 | 12/2015 | Zheng et al. | |
| 2016/0094374 A1* | 3/2016 | Koorapaty | H04L 27/262 |
| | | | 370/329 |
| 2016/0150435 A1 | 5/2016 | Baek et al. | |
| 2016/0255649 A1* | 9/2016 | Kusashima | H04W 28/06 |

FOREIGN PATENT DOCUMENTS

| | | |
|---|---|---|
| CN | 104125643 A | 10/2014 |
| JP | 2014057138 A | 3/2014 |
| KR | 20110127051 A | 11/2011 |
| WO | 2012061521 A1 | 5/2012 |

OTHER PUBLICATIONS

International Search Report and Written Opinion—PCT/US2015/051215—ISA/EPO—dated Nov. 24, 2015. (16 pages).

Samsung: "Detailed Design of Discovery Signal", 3GPP Draft; R1-143067-Discovery-Signal-Design, 3rd Generation Partnership Project (3GPP), Mobile Competence Centre ; 650, Route Des Lucioles ; F-06921 Sophia-Antipolis Cedex ; France vol. RAN WG1, No. Dresden, Germany; Aug. 18, 2014-Aug. 22, 2014 Aug. 10, 2014 (Aug. 10, 2014), XP050815461, Retrieved from the Internet: URL:http://www.3gpp.org/ftp/tsg_ran/WG1_RL1/TSGR1_78/Docs/ [retrieved on Aug. 10, 2014]. (6 pages).

Sharp: "On the Design of the Discovery Signal", 3GPP DRAFT; R1-143122, 3rd Generation Partnership Project (3GPP), Mobile Competence Centre ; 650, Route Des Lucioles ; F-06921 Sophia-Antipolis Cedex ; France vol. RAN WG1, No. Dresden, Germany; Aug. 18, 2014-Aug 22, 2014 Aug. 17, 2014 (Aug. 17, 2014), XP050788600, Retrieved from the Internet: URL:http://www.3gpp.org/ftp/Meetings_3GPP_ SYNC/RAN1/Docs/ [retrieved on Aug. 17, 2014]. (5 pages).

LG Electronics: "Considerations on DRS-based RSRQ measurement", R1-142139, May 19-23, 2014, 4 pages.

Huawei et al., "Clarifications on PDSCH and EPDCCH rate matching for CSI-RS in DRS", 3GPP TSG RAN WG1 Meeting #78bis R1-143908, Oct. 6-10, 2014, 2 pages.

Huawei, "Summary of Offline Discussions on Small Cell Discovery Signal", 3GPP TSG RAN WG1 #78bis R1-144473, Oct. 6-10, 2014, 10 pages.

\* cited by examiner

800

802
IDENTIFY A SYSTEM BANDWIDTH OF A CELL

804
RECEIVE A CONFIGURATION IDENTIFYING RESOURCES FOR PERFORMING MEASUREMENTS, THE IDENTIFIED RESOURCES CORRESPONDING TO REFERENCE SIGNALS ASSOCIATED WITH A MEASUREMENT BANDWIDTH

806
RECEIVE AT LEAST ONE CHANNEL FROM THE CELL ALONG WITH AN INSTANCE OF THE REFERENCE SIGNALS

808
DETERMINE A RATE MATCHING BANDWIDTH FOR PERFORMING RATE MATCHING FOR THE AT LEAST ONE CHANNEL AROUND AT LEAST A PORTION OF THE REFERENCE SIGNALS

810
PERFORM RATE MATCHING FOR THE AT LEAST ONE CHANNEL BASED ON THE DETERMINED RATE MATCHING BANDWIDTH AND THE IDENTIFIED RESOURCES

FIG. 8

RATE MATCHING AROUND REFERENCE SIGNALS IN WIRELESS COMMUNICATIONS

CLAIM OF PRIORITY UNDER 35 U.S.C. § 119

The present application for patent claims priority to Provisional Application No. 62/074,490 entitled "RATE MATCHING AROUND REFERENCE SIGNALS IN WIRELESS COMMUNICATIONS" filed Nov. 3, 2014, which is assigned to the assignee hereof and hereby expressly incorporated by reference herein.

BACKGROUND

Described herein are aspects generally related to communication systems, and more particularly, to rate matching in the presence of reference signals in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing LTE, a user equipment (UE) can perform rate matching for a physical downlink shared channel (PDSCH) and an enhanced physical downlink control channel (EPDCCH) received from a cell. The UE can be configured to perform the rate matching around (e.g., avoiding) known resource elements (RE) used for transmission of channel state information reference signals (CSI-RS). Correspondingly, the eNB does not map PDSCH and/or EPDCCH data for transmission in the known REs. Further, the eNB can configure the UE with locations of the REs used for CSI-RS, which may include RE locations of CSI-RS transmitted by the cell (also referred to as non-zero-power CSI-RS) as well as RE locations of CSI-RS or other signals transmitted by other cell(s) (also referred to as zero-power CSI-RS). Accordingly, the cell can utilize REs outside of the configured non-zero-power and zero-power CSI-RS REs for mapping PDSCH and/or EPDCCH communications, and the UE can accordingly rate match the PDSCH and/or EPDCCH based on REs around (e.g., not including) the non-zero-power and zero-power CSI-RS REs indicated in the configuration.

In addition, in wireless communication systems employing LTE, small cells can be heterogeneously deployed to provide increased system performance and diversity over a wireless network. Small cells may include, for example, pico cells, femto cells, and/or other types of cells having relatively lower transmit power and/or relatively smaller coverage area as compared to macro cells or macro base stations. Small cells can be turned on and off dynamically (e.g., by macro base stations or other network nodes) for inter-cell interference coordination and avoidance, load balancing, energy savings, etc. As such, small cells can transmit one or more reference signals, including cell-specific reference signals (CRS), primary synchronization signals (PSS), secondary synchronization signals (SSS), and/or configurable channel state information reference signals (CSI-RS), as discovery reference signals (DRS). In transmitting one or more of the reference signals as DRS, the small cell may utilize a maximum allowed measurement bandwidth, which can be less than a system bandwidth. User equipment (UEs) can accordingly discover small cells that are turned on based at least in part on receiving one or more of the DRSs.

When CSI-RS is transmitted as a DRS, the associated configuration received for the CSI-RS may not be explicit as to whether non-zero-power and/or zero-power CSI-RSs used for DRS are transmitted over the entire system bandwidth or over the maximum allowed measurement bandwidth, which may lead to undesirable results in performing rate matching for PDSCH and/or EPDCCH.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Described herein are various aspects related to methods, apparatus, and computer programs for determining a bandwidth for rate matching at least one channel around a discovery reference signal (DRS), which may include reference signals such as channel state information reference signals (CSI-RS). For example, a user equipment (UE) receiving a channel mapped around a DRS may need information identifying the extent to rate match based on the DRS configuration. For example, DRS may occupy a system bandwidth or a measurement bandwidth, which can be less than the system bandwidth. Accordingly, when rate matching the channel around a DRS, the UE may need to determine whether the configurable reference signal sent as the DRS utilizes the related resources over the entire system bandwidth or whether the configurable reference signal sent as the DRS utilizes the related resources over the measurement bandwidth. Various aspects described herein are directed to mechanisms by which a bandwidth used for DRS can be determined and utilized in rate matching at least one channel around the DRS.

According to an example, a method for rate matching around reference signaling is provided. The method includes receiving a DRS configuration identifying first resources related to non-zero power reference signals for DRS transmitted by a cell over a first bandwidth and second resources related to zero power reference signals for the DRS over a second bandwidth, the first bandwidth being less than or equal to the second bandwidth, receiving at least one channel from the cell along with an instance of the non-zero power reference signals and the zero power reference signals, and performing rate matching for the at least one channel around the second resources over the second bandwidth.

In other aspects, a user equipment for rate matching around reference signaling is provided. The user equipment includes a transceiver, at least one processor communicatively coupled with the transceiver via a bus for communicating signals in a wireless network, and a memory communicatively coupled with the at least one processor and/or the transceiver via the bus. The at least one processor and the memory are operable to receive, via the transceiver, a discovery reference signal (DRS) configuration identifying first resources related to non-zero power reference signals for DRS transmitted by a cell over a first bandwidth and second resources related to zero power reference signals for the DRS over a second bandwidth, the first bandwidth being less than or equal to the second bandwidth, receive, via the transceiver, at least one channel from the cell along with an instance of the non-zero power reference signals and the zero power reference signals, and perform rate matching for the at least one channel around the second resources over the second bandwidth.

In another example, a user equipment for rate matching around reference signaling is provided. The user equipment includes means for receiving a discovery reference signal (DRS) configuration identifying first resources related to non-zero power reference signals for DRS transmitted by a cell over a first bandwidth and second resources related to zero power reference signals for the DRS over a second bandwidth, the first bandwidth being less than or equal to the second bandwidth, means for receiving at least one channel from the cell along with an instance of the non-zero power reference signals and the zero power reference signals, and means for performing rate matching for the at least one channel around the second resources over the second bandwidth.

In other aspects, a computer-readable medium storing computer executable code for rate matching around reference signaling is provided. The code includes code for receiving a discovery reference signal (DRS) configuration identifying first resources related to non-zero power reference signals for DRS transmitted by a cell over a first bandwidth and second resources related to zero power reference signals for the DRS over a second bandwidth, the first bandwidth being less than or equal to the second bandwidth, code for receiving at least one channel from the cell along with an instance of the non-zero power reference signals and the zero power reference signals, and code for performing rate matching for the at least one channel around the second resources over the second bandwidth.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flow chart of an example method for rate matching for a channel around one or more reference signals based on a determined rate matching bandwidth in accordance with aspects described herein.

DETAILED DESCRIPTION

Figure 1:
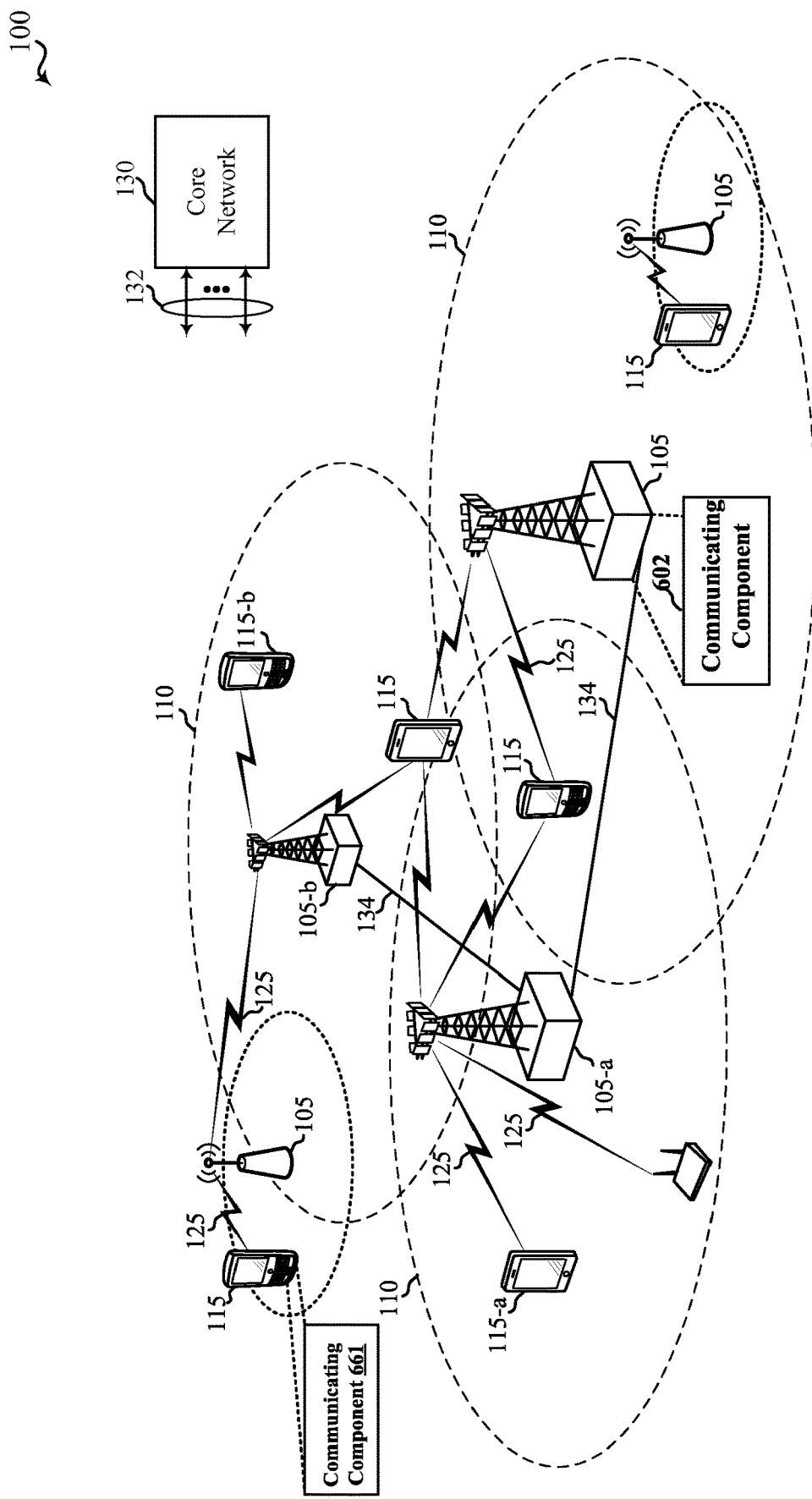
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Described herein are various aspects related to determining a bandwidth for rate matching at least one channel around a reference signal that can be mapped over a configurable portion of a system bandwidth. Rate matching can be defined to include matching a number of transport block bits received in a channel to a number of bits that can be transmitted for a resource allocation related to the channel. Rate matching can occur around resources corresponding to reference signals included in the channel transmission, as the resources do not relate to the channel transmission. In some cases, resources used by reference signals can be configurable, such as for a channel state information reference signal (CSI-RS). In this example, a transmitting node, such as an evolved Node B (eNB) in LTE, can specify information regarding resources utilized for configurable reference signal transmission to a receiving node (e.g., a user equipment (UE) in LTE) to allow the receiving node to rate match around the configurable reference signals.

For example, such information regarding resources may identify resources related to the reference signal (e.g., an indication of one or more resource elements, also referred to as resources herein, over which the configurable reference signals are transmitted). In an example, the configurable reference signal may include a discovery reference signal (DRS) where the DRS may be mapped over a measurement bandwidth that is less than the system bandwidth. For example, the system bandwidth can correspond to a bandwidth over which a radio access technology (RAT) corresponding to the eNB and UE defines for operation (e.g., 20 megahertz (MHz) in LTE), and the measurement bandwidth can be a bandwidth less than or equal to the system bandwidth that the eNB defines (and/or configures to the UE) over which some reference signals are transmitted by the eNB for measurement purposes. Where the configurable reference signal includes a DRS mapped over a measurement bandwidth, not all indicated resource elements in the system bandwidth may be used in transmitting the configurable reference signal. Accordingly, when rate matching the channel around the configurable reference signal (e.g., transmitted as a DRS), the UE may either assume or otherwise determine that the configurable reference signal utilizes the related resources over the entire system bandwidth and rate match around the resources, or may assume or otherwise determine that the configurable reference signal utilizes the related resources over the measurement bandwidth. The UE can accordingly rate match around the resources used for transmitting the configurable reference signal (e.g., transmitted as a DRS) over the system bandwidth or within the measurement bandwidth based on whether the configurable reference signal is determined or assumed to be mapped to the system bandwidth or measurement bandwidth.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a communicating component 602 configured to transmit resource grants (e.g., for control and/or data uplink communications) to UEs 115 for communicating with the access points 105. The communicating component 602 can also provide configuration information regarding resources configured for reference signal transmission, as described further herein. UEs 115 can include a communicating component 661 for rate matching at least one channel based on determining the resources configured for reference signal transmission.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. It is to be appreciated that there can be a PCell for each communication link 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications link 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
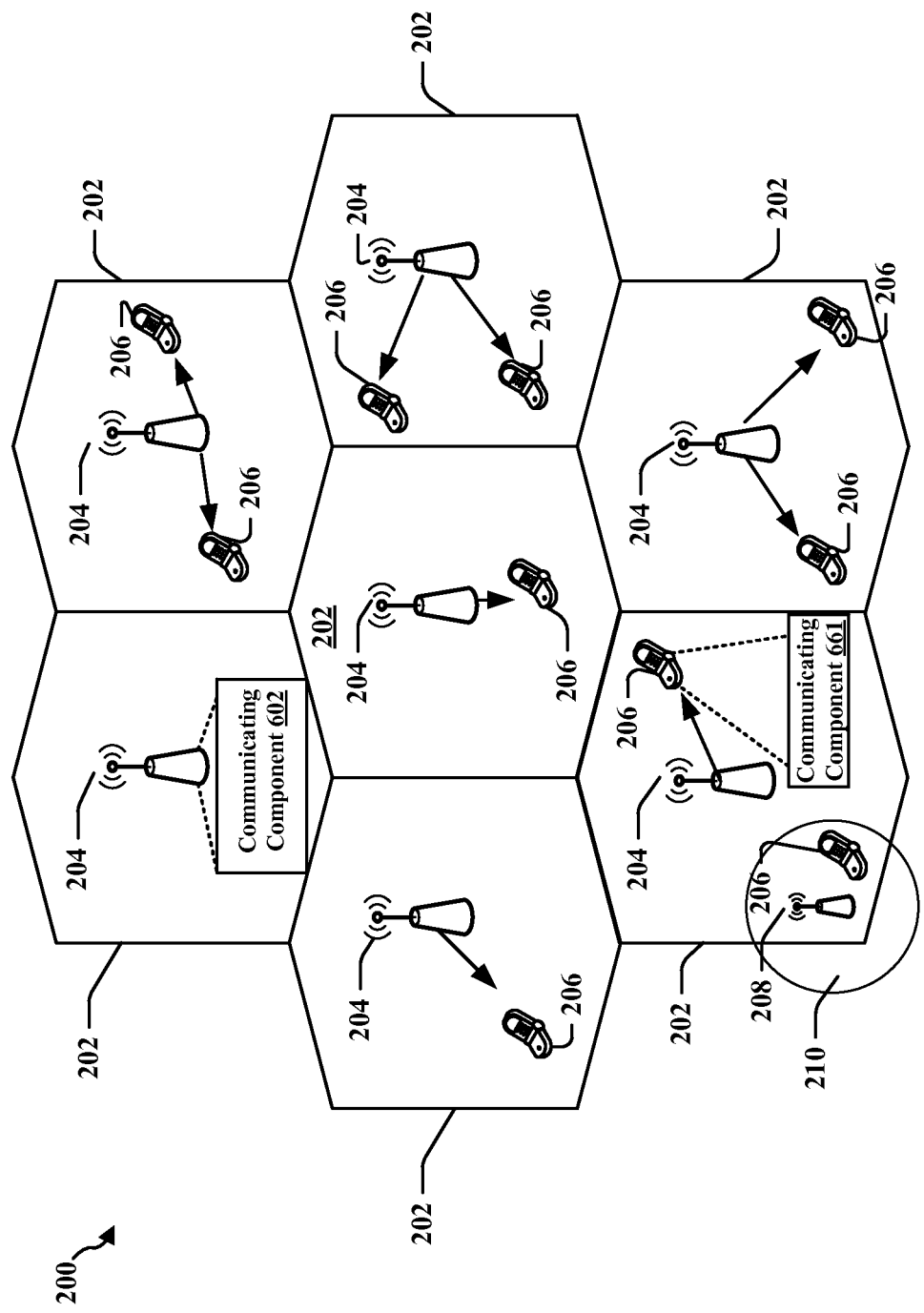
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNBs 208 may be a small cell (e.g., home eNB (HeNB)), femto cell pico cell, micro cell, or remote radio head (RRH). The macro eNBs 204 are each assigned to a respective cell 202 and are configured to provide an access point to a core network (e.g., core network 130) for all the UEs 206 in the cells 202. In an aspect, eNBs 204 and/or lower power class eNBs 208 may include a communicating component 602 configured to generate and transmit resource grants to UEs 206 for communicating therewith, and/or configuration information regarding resources configured for reference signal transmission, as described further herein. UEs 206 may include a communicating component 661 for rate matching at least one channel based on determining resources configured for reference signal transmission. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
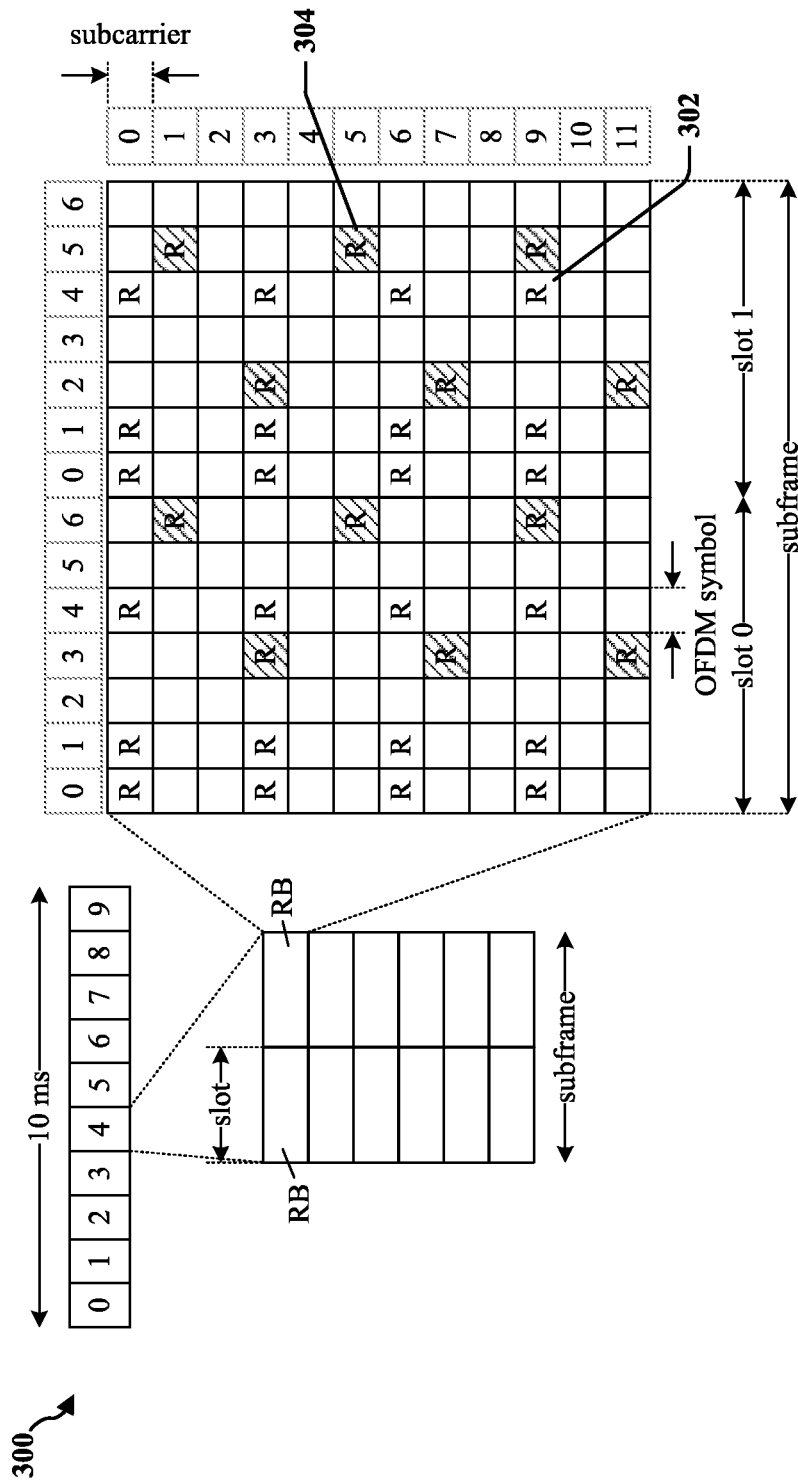
FIG. 3 is a diagram illustrating an example of a downlink (DL) frame structure in long term evolution (LTE).

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, for a total of 84 resource elements. For an extended cyclic prefix, a resource element block may contain 6 consecutive OFDM symbols in the time domain, for a total of 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding physical downlink shared channel (PDSCH) is mapped. The number of bits carried by each resource element depends on the modulation scheme. Thus, the more resource element blocks that a UE receives and the higher the modulation scheme, the higher the data rate for the UE.

An eNB can map channel data (e.g., for a PDSCH, EPDCCH, etc.) over REs that do not correspond to at least the REs indicated as R 302. Correspondingly, a receiving UE can rate match around the REs indicated as R 302 in decoding the channel data. In addition, one or more of the remaining RE blocks may include one or more configurable CSI-RSs, where information regarding configuration of the CSI-RSs in the one or more REs is provided from the eNB to the UE. Accordingly, the UE can additionally rate match around the configurable CSI-RSs based on information in the received CSI-RS configuration. Where the CSI-RSs correspond to a DRS, as described, the CSI-RSs may occupy a portion of the system bandwidth (e.g., a maximum allowed measurement bandwidth), but not necessarily the entire system bandwidth.

Figure 4:
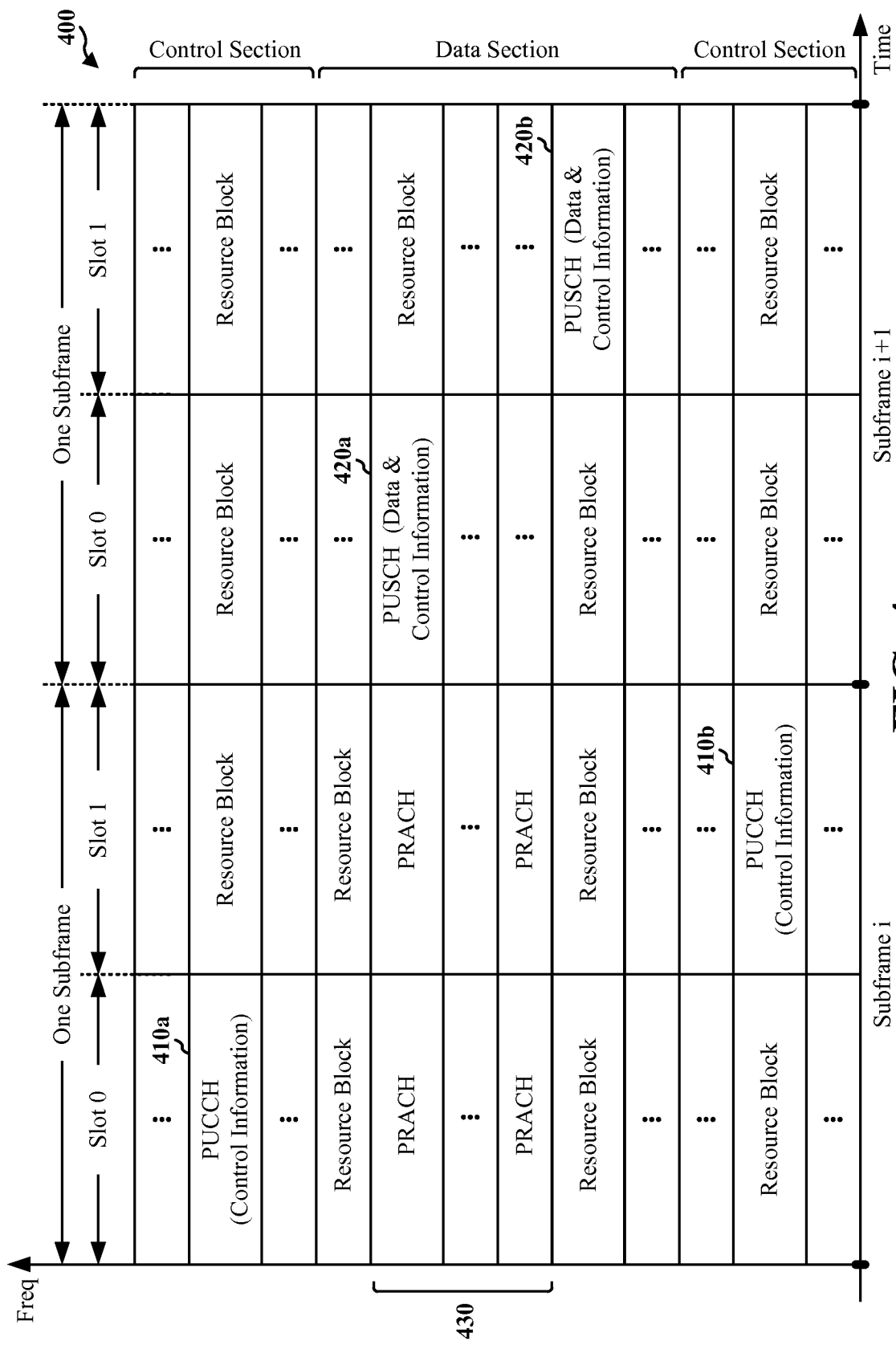
FIG. 4 is a diagram illustrating an example of an uplink (UL) frame structure in LTE.

FIG. 4 is a diagram 400 illustrating an example of an UL frame structure in LTE, which, in some examples, may be utilized in conjunction with the ULL LTE UL frame structure described herein. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
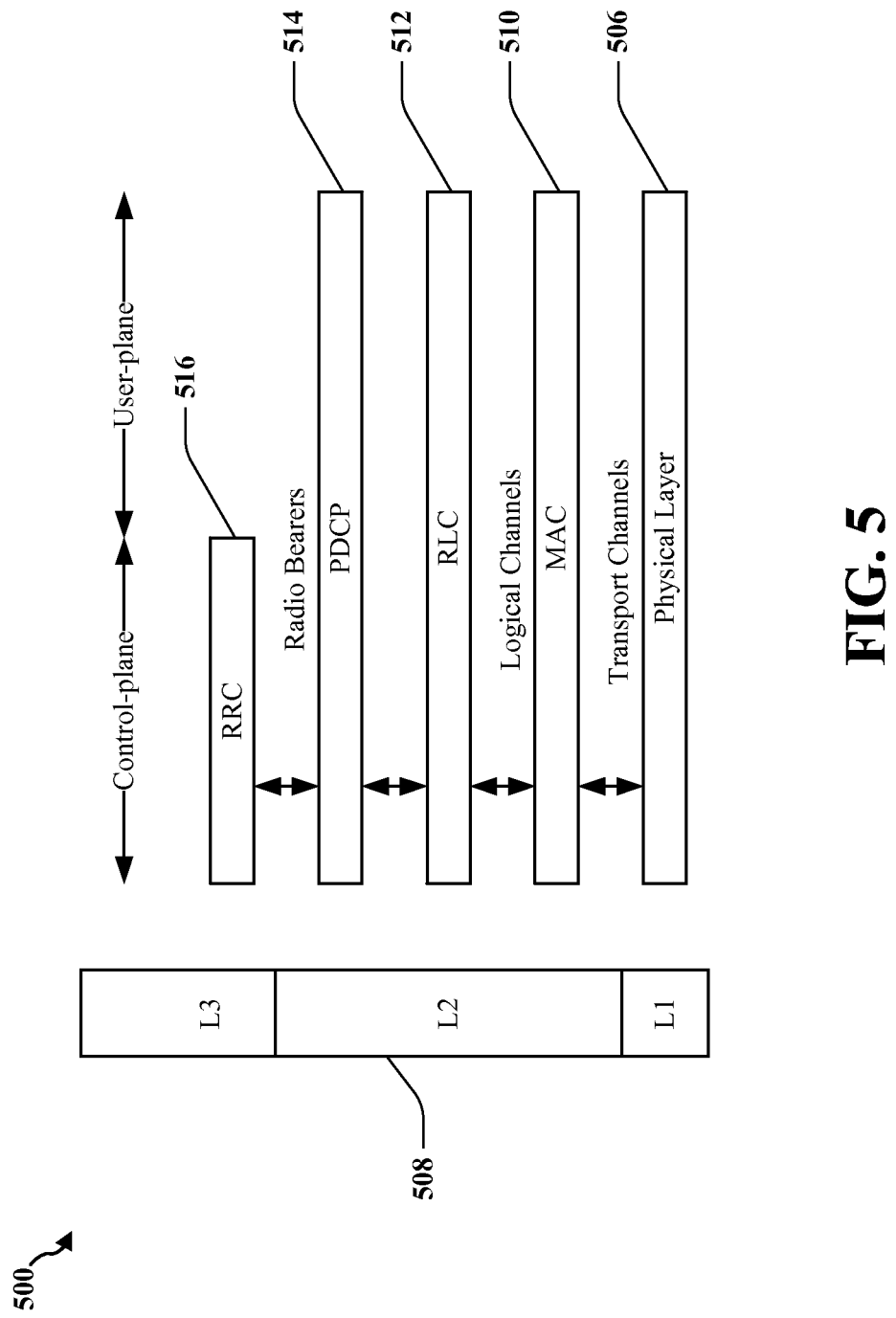
FIG. 5 is a diagram illustrating an example of a radio protocol architecture for the user and control planes.

FIG. 5 is a diagram 500 illustrating an example of a radio protocol architecture for the user and control planes in LTE and ULL LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
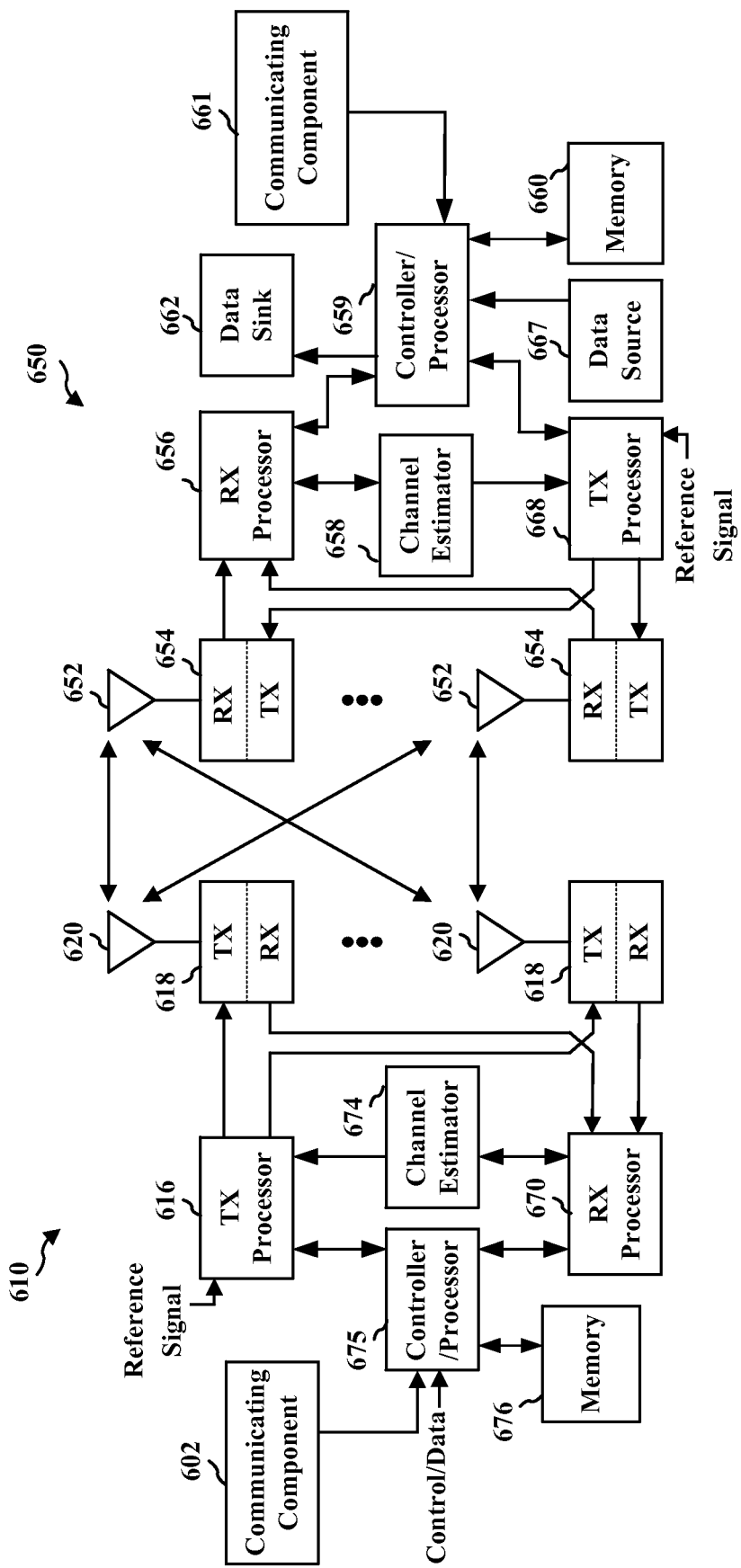
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a communicating component 602 configured to generate and transmit resource grants to UE 650 and/or configuration information regarding resources configured for reference signal transmission. Though communicating component 602 is shown as coupled to controller/processor 675, it is to be appreciated that communicating component 602 can also be coupled to other processors (e.g., TX processor 616, RX processor 670, etc.) and/or implemented by the one or more processors 616, 670, 675 to perform actions described herein. Moreover, memory 676 may be configured to store one or more instructions and/or parameters enabling implementation and/or execution of communicating component 602. Further, in an aspect, communicating component 602 may be implemented by a combination of one or more of the processors (controller/processor 675, TX processor 616, RX processor 670) and memory 676.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a communicating component 661 configured for rate matching at least one channel based on determining resources configured for reference signal transmission. Though communicating component 661 is shown as coupled to controller/processor 659, it is to be appreciated that communicating component 661 can also be coupled to other processors (e.g., RX processor 656, TX processor 668, etc.) and/or implemented by the one or more processors 656, 659, 668 to perform actions described herein. Moreover, memory 660 may be configured to store one or more instructions and/or parameters enabling implementation and/or execution of communicating component 661. Further, in an aspect, communicating component 661 may be implemented by a combination of one or more of the processors (controller/processor 659, RX processor 656, TX processor 668) and memory 660.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
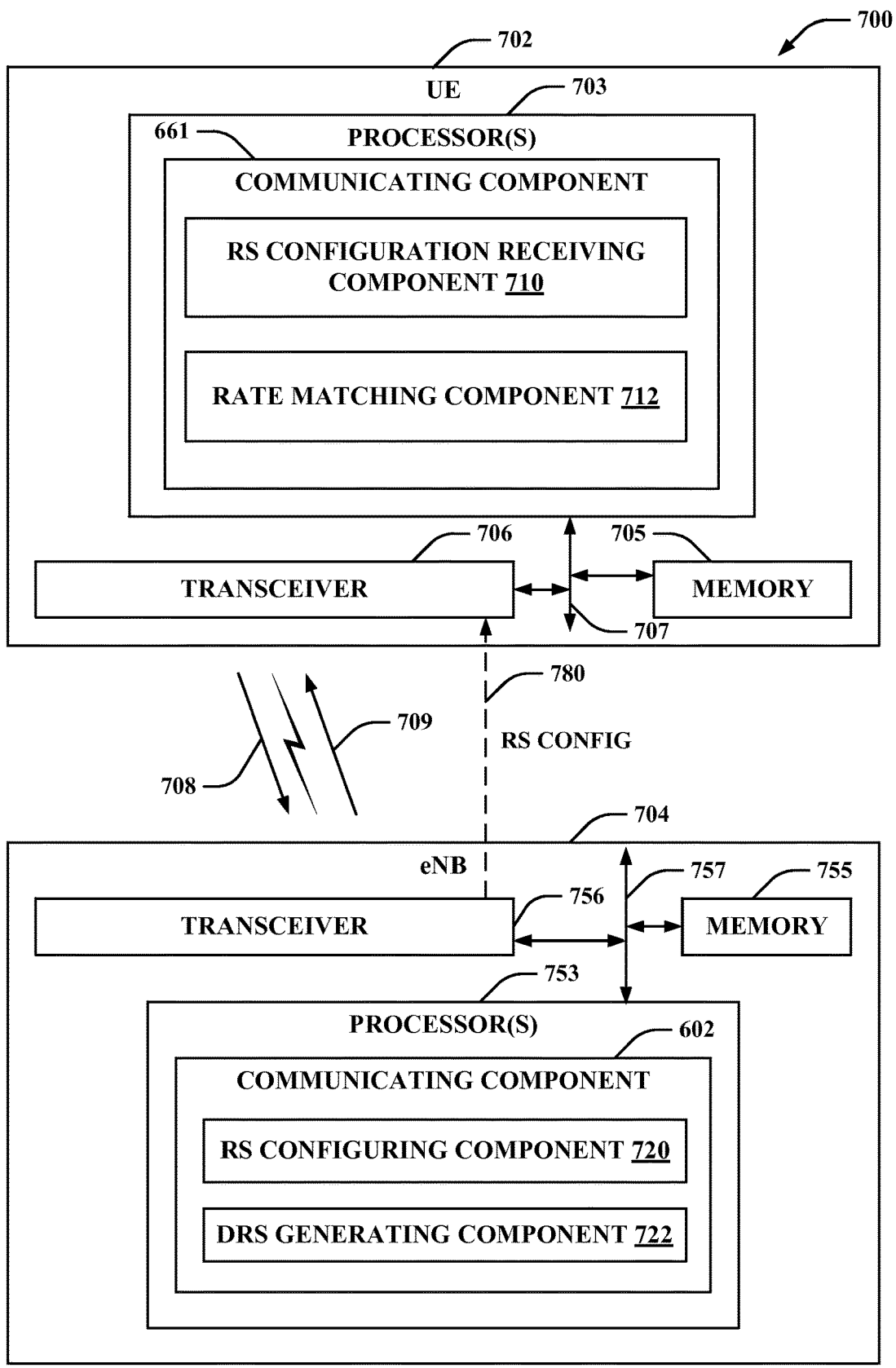
FIG. 7 is a diagram illustrating an example system for facilitating rate matching around reference signals in accordance with aspects described herein.
Figure 9:
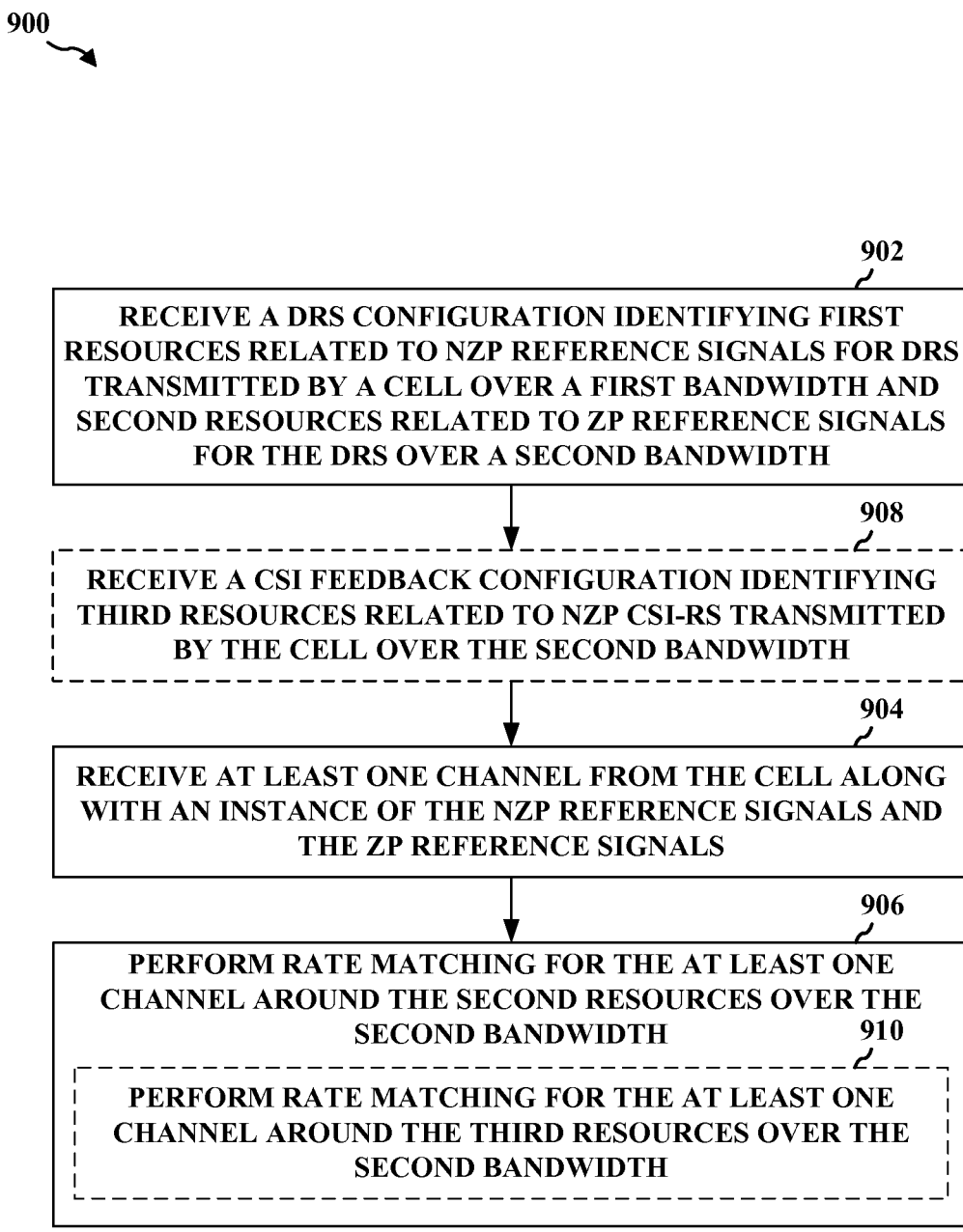
FIG. 9 is a flow chart of an example method for rate matching for a channel around one or more reference signals based on a received configuration in accordance with aspects described herein.

Referring to FIGS. 7-9, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIG. 8 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 7 illustrates an example system 700 for rate matching at least one received channel around a reference signal transmission. System 700 includes a UE 702 that communicates with an eNB 704 to access a wireless network, examples of which are described in FIGS. 1, 2, and 6, above. In an aspect, eNB 704 and UE 702 may have established one or more downlink channels over which to communicate via downlink signals 709, which can be transmitted by eNB 704 (e.g., via transceiver 756) and received by UE 702 (e.g., via transceiver 706) for communicating control and/or data messages (e.g., in signaling) from the eNB 704 to the UE 702 over configured communication resources. Moreover, for example, eNB 704 and UE 702 may have established one or more uplink channels over which to communicate via uplink signals 708, which can be transmitted by UE 702 (e.g., via transceiver 706) and received by eNB 704 (e.g., via transceiver 756) for communicating control and/or data messages (e.g., in signaling) from the UE 702 to the eNB 704 over configured communication resources. eNB 704 may communicate resource allocation information (e.g., resource grants) to the UE 702 to indicate downlink and/or uplink channels (e.g., portions of frequency in specific periods of time) that are allocated to the UE 702 for receiving or transmitting communications. In addition, in an example, eNB 704 can transmit one or more parameters related to an RS configuration 780 to the UE 702 to allow the UE 702 to rate match one or more channels around one or more RSs.

In an aspect, UE 702 may include one or more processors 703 and/or a memory 705 that may be communicatively coupled, e.g., via one or more buses 707, and may operate in conjunction with or otherwise implement a communicating component 661 for communicating with eNB 704 such to transmit uplink signals 708 thereto and/or receive downlink signals 709 therefrom. For example, the various operations related to communicating component 661 may be implemented or otherwise executed by one or more processors 703 and, in an aspect, can be executed by a single processor, while in other aspects, different ones of the operations may be executed by a combination of two or more different processors. For example, in an aspect, the one or more processors 703 may include any one or any combination of a modem processor, or a baseband processor, or a digital signal processor, or an application specific integrated circuit (ASIC), or a transmit processor, receive processor, or a transceiver processor associated with transceiver 706. Further, for example, the memory 705 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 703. Moreover, memory 705 or computer-readable storage medium may be resident in the one or more processors 703, external to the one or more processors 703, distributed across multiple entities including the one or more processors 703, etc.

In particular, the one or more processors 703 and/or memory 705 may execute actions or operations defined by communicating component 661 or its subcomponents. For instance, the one or more processors 703 and/or memory 705 may execute actions or operations defined by a RS configuration receiving component 710 for receiving one or more parameters related to one or more configurable reference signals from eNB 704 or other network nodes. In an aspect, for example, RS configuration receiving component 710 may include hardware (e.g., one or more processor modules of the one or more processors 703) and/or computer-readable code or instructions stored in memory 705 and executable by at least one of the one or more processors 703 to perform the specially configured RS configuration receiving operations described herein. Further, for instance, the one or more processors 703 and/or memory 705 may execute actions or operations defined by a rate matching component 712 for rate matching around one or more RSs based on the RS configuration. In an aspect, for example, rate matching component 712 may include hardware (e.g., one or more processor modules of the one or more processors 703) and/or computer-readable code or instructions stored in memory 705 and executable by at least one of the one or more processors 703 to perform the specially configured rate matching operations described herein.

Similarly, in an aspect, eNB 704 may include one or more processors 753 and/or a memory 755 that may be communicatively coupled, e.g., via one or more buses 757, and may operate in conjunction with or otherwise implement a one or more of a communicating component 602 for communicating one or more resource grants to a UE 702 and/or transmitting or receiving communications to/from the UE 702 based on the one or more resource grants. For example, the various functions related to communicating component 602 may be implemented or otherwise executed by one or more processors 753 and, in an aspect, can be executed by a single processor, while in other aspects, different ones of the functions may be executed by a combination of two or more different processors, as described above. It is to be appreciated, in one example, that the one or more processors 753 and/or memory 755 may be configured as described in examples above with respect to the one or more processors 703 and/or memory 705 of UE 702.

In an example, the one or more processors 753 and/or memory 755 may execute actions or operations defined by communicating component 602 or its subcomponents. For instance, the one or more processors 753 and/or memory 755 may execute actions or operations defined by a RS configuring component 720 for configuring one or more configurable reference signals and/or indicating one or more parameters corresponding to the configuration of the one or more configurable reference signals. In an aspect, for example, RS configuring component 720 may include hardware (e.g., one or more processor modules of the one or more processors 753) and/or computer-readable code or instructions stored in memory 755 and executable by at least one of the one or more processors 753 to perform the specially configured RS configuring operations described herein. Further, for instance, the one or more processors 753 and/or memory 755 may execute actions or operations defined by a DRS generating component 722 for generating a DRS based on the configurable reference signals. In an aspect, for example, DRS generating component 722 may include hardware (e.g., one or more processor modules of the one or more processors 753) and/or computer-readable code or instructions stored in memory 755 and executable by at least one of the one or more processors 753 to perform the specially configured DRS generating operations described herein.

It is to be appreciated that transceivers 706, 756 may be configured to transmit and receive wireless signals through one or more antennas, an RF front end, one or more transmitters, and one or more receivers. In an aspect, transceivers 706, 756 may be tuned to operate at specified frequencies such that UE 702 and/or eNB 704 can communicate at a certain frequency. In an aspect, the one or more processors 703 may configure transceiver 706 and/or one or more processors 753 may configure transceiver 756 to operate at a specified frequency and power level based on a configuration, a communication protocol, etc. to communicate uplink signals 708 and/or downlink signals 709, respectively, over related uplink or downlink communication channels.

In an aspect, transceivers 706, 756 can operate in multiple bands (e.g., using a multiband-multimode modem, not shown) such to process digital data sent and received using transceivers 706, 756. In an aspect, transceivers 706, 756 can be multiband and be configured to support multiple frequency bands for a specific communications protocol. In an aspect, transceivers 706, 756 can be configured to support multiple operating networks and communications protocols. Thus, for example, transceivers 706, 756 may enable transmission and/or reception of signals based on a specified modem configuration.

As described, DRS generating component 722 can generate the DRSs where eNB 704 can utilize the DRS to allow UEs to discover the eNB 704. This can facilitate management of an on/off procedure, as described, where the power cycle of the eNB 704 can be managed (e.g., by eNB 704, other eNBs, or other network nodes) to assist in achieving inter-cell interference coordination/avoidance, load balancing, energy savings, etc. For example, the power cycle of the eNB 704 may be managed based on procedures such as handover (e.g., to/from eNB 704 or another neighboring eNB), secondary eNB addition/removal of eNB 704 or in the vicinity of eNB 704, secondary eNB activation/deactivation, determined traffic load increase at eNB 704 or another neighboring eNB, detected UE arrival/departure near eNB 704 or at a neighboring eNB, based on packet arrival/completion at eNB 704 or another neighboring eNB, etc. DRS generating component 722 can generate DRSs for one or more cells provided by the eNB 704, where a cell can relate to one or more sectors, component carriers, etc. In addition, RS configuring component 720 can transmit a RS configuration 780 to UEs to configure the UEs to measure the DRSs for radio resource management (RRM). UEs can utilize the DRSs to discover the cells transmitting DRS (e.g., and thus discover the cell as powered on), and may begin processing other signals from the cells (e.g., PSS, SSS, physical broadcast channel (PBCH), CRS, physical control format indicator channel (PCFICH), PDSCH, PDCCH, EPDCCH, physical HARQ indicator channel (PHICH), demodulation reference signal (DM-RS), CSI-RS, etc.) once the DRS is detected and/or once a positioning reference signal (PRS) of the cell is received and processed by communicating component 661.

In an example, communicating component 602 can transmit DRS in a downlink subframe, a downlink pilot time slot (DwPTS) region of a subframe, etc., during DRS occasions. The DRS occasions may include a number of consecutive subframes for a given cell (e.g., 1-5 or 2-5 subframes depending on whether the cell utilizes FDD or TDD), and the DRS occasions may occur at certain intervals (e.g., every 40, 80, 106, etc. milliseconds (ms)). In an example, the DRS occasion for the cell of eNB 704 may be configured by other eNBs, other network nodes, etc. to achieve inter-cell interference cancelation. DRS can include one or more reference signals, such as a cell-specific reference signal (CRS), primary synchronization signal (PSS), secondary synchronization signal (SSS), configurable channel state information reference signal (CSI-RS), and/or the like, and DRS generating component 722 may generate the one or more reference signals as DRSs by utilizing a measurement bandwidth (also referred to as a maximum allowed measurement bandwidth), which may be less than the system bandwidth.

Some reference signals, such as CSI-RS, are configurable such that RS configuring component 720 can determine a configuration for transmitting the reference signals, and may indicate configuration information for the reference signal to the UE 702. The configuration information may identify resources used to transmit the configurable reference signals, such as one or more resource element (RE) locations within a resource block and/or a corresponding measurement bandwidth. Accordingly, RS configuration receiving component 710 can receive the configuration and determine resources (e.g., RE locations within resource blocks, a bandwidth including a plurality of the resource blocks, etc.) over which one or more eNBs are transmitting the configurable reference signals. Accordingly, communicating component 661 may perform measurement of the configurable reference signals over the indicated resources based on the indicated RE locations and/or the measurement bandwidth. In addition, in an example, rate matching component 712 may perform rate matching for one or more control or data channels around the resources used for the configurable reference signal, and/or the like based on the indicated RE locations over the measurement bandwidth or the system bandwidth, as described herein. Reference signals transmitted by the eNB 704 are generally referred to herein as non-zero-power (NZP) reference signals, and a DRS occasion can include multiple NZP CSI-RS RE configurations that may be in the same or different subframes and may be scrambled independently. In any case, RS configuring component 720 can specify configuration information of the NZP CSI-RS to the UE 702 to allow the UE to measure the NZP CSI-RS.

In an example, RS configuring component 720 can additionally or alternatively indicate, in the configuration for the configurable reference signals, resources over which the eNB 704 blanks communication to allow other eNBs/cells to transmit reference signals substantially free from interference by the eNB 704. It is to be appreciated that blanking communication, in this regard, can refer to refraining from transmitting over the resources, powering down one or more components of a radio frequency (RF) front end over a period of time related to the resources, etc. These blanked resources are referred to herein as zero-power (ZP) reference signals, and RS configuring component 720 can indicate the zero-power reference signals to the UE 702 as well. In a specific example, in LTE, RS configuring component 720 can configure up to 5 ZP CSI-RS configurations for the UE 702 for rate matching in relation to the DRS. Thus, communicating component 661 can perform measurements over the ZP reference signals based on the indicated resources based on indicated RE locations and/or a measurement bandwidth. In addition, in an example, rate matching component 712 can additionally or alternatively rate match one or more control or data channels around the resources indicated for the zero-power reference signals over the measurement bandwidth and/or the system bandwidth, as described herein.

FIG. 8 illustrates an example method 800 for rate matching at least one channel around reference signals (e.g., by a UE 702 operating a rate matching component 712).

Method 800 can include, at Block 802, identifying a system bandwidth of a cell. Communicating component 661 can identify the system bandwidth of the cell, where the cell can include one or more cells provided by eNB 704. For example, communicating component 661 can identify the system bandwidth based at least in part on a configuration received from eNB 704, a configuration stored at UE 702, etc. The system bandwidth can correspond to a bandwidth defined for communicating according to a wireless network technology (e.g., 20 MHz for LTE).

Method 800 also includes, at Block 804, receiving a configuration identifying resources for performing measurements, the identified resources corresponding to reference signals associated with a measurement bandwidth. RS configuration receiving component 710 can receive the configuration identifying resources for performing measurements where the identified resources correspond to reference signals associated with a measurement bandwidth. In this example, RS configuring component 720 can generate and communicate as RS configuration 780 identifying the resources, measurement bandwidth, and/or one or more of the related parameters to the UE 702. For example, the configuration can indicate RE locations within resource blocks over which the eNB 704 transmits the reference signals. The configuration can also indicate a measurement bandwidth (e.g., which can be less than the system bandwidth) including a plurality of resource blocks over which the eNB 704 transmits the reference signals in the REs. This configuration, specifying the measurement bandwidth that can be less than the system bandwidth, may be a DRS configuration indicating the REs and measurement bandwidth for transmitting the reference signal as a DRS. In any case, RS configuration receiving component 710 can receive the configuration from eNB 704 and may determine the resources over which the reference signals are received (e.g., as REs over a number of RBs in the system bandwidth or the indicated measurement bandwidth).

The reference signals may relate to non-zero-power reference signals transmitted by the eNB 704, which can be used for measuring to determine that the eNB 704 is powered on and/or can be used to access a wireless network. The configuration generated and communicated by the RS configuring component 720 may also include configuration information for zero-power reference signals, which may include signals transmitted by other eNBs. For example, the zero-power reference signals may include reference signals transmitted by nearby eNBs that may potentially interfere with communications between UE 702 and eNB 704, and thus the eNB 704 may blank communication over the corresponding resources. Similarly, the configuration information for zero-power reference signals may indicate REs within an RB that can correspond to the zero-power reference signals, but it is possible that the zero-power reference signals are enabled outside the measurement bandwidth. Accordingly, in any case, rate matching component 712 can determine whether to rate match at least one channel around the non-zero-power and/or zero-power reference signals, as indicated in the configuration, over the system bandwidth and/or within the measurement bandwidth. It is to be appreciated that the reference signal configuration for non-zero-power and zero-power signals can be generated by the RS configuring component 720 to be specific to a given UE (e.g., UE 702). For example, the zero-power reference signals may correspond to reference signals determined to be transmitted by cells that are near (e.g., within a threshold distance of) the specific UE.

Method 800 also includes, at Block 806, receiving at least one channel from the cell along with an instance of the reference signals. Communicating component 661 can receive at least one channel from the cell along with the instance of the reference signals (e.g., instances of signals received over the non-zero-power reference signal resources and/or over the zero-power reference signal resources indicated in the configuration). For example, the reference signals may be received as a DRS (e.g., over the measurement bandwidth) or otherwise (e.g., over the system bandwidth). In one example, instances of the non-zero-power reference signals may be received over the measurement bandwidth, and instances of the zero-power reference signals may be received or assumed over the system bandwidth. In a specific example in LTE, the at least one channel can correspond to a control and/or data channel (e.g., a PDSCH), enhanced physical downlink control channel (EPDCCH), etc.). In any case, DRS generating component 722 can generate an instance of the non-zero-power reference signals as a DRS that may utilize resources over the measurement bandwidth, and communicating component 602 can transmit the reference signals as the DRS to UE 702 along with the control and/or data channel, which are received by communicating component 661.

Method 800 includes, at Block 808, determining a rate matching bandwidth for performing rate matching for the at least one channel around at least a portion of the reference signals, and, at Block 810, performing rate matching for the at least one channel based on the determined rate matching bandwidth and the identified resources. Rate matching component 712 can determine the rate matching bandwidth for performing rate matching for the at least one channel around at least the portion of the reference signals, and can perform rate matching for the at least one channel based on the determined rate matching bandwidth and the identified resources. For instance, rate matching component 712 can determine the rate matching bandwidth to be the system bandwidth or the measurement bandwidth, which may be based on one or more parameters in the RS configuration from eNB 704. In another example, rate matching component 712 can determine the rate matching bandwidth based on a type of the reference signals. As described further herein in an example, rate matching component 712 may determine to rate match around the zero-power reference signals over the system bandwidth regardless of the measurement bandwidth. Where rate matching component 712 determines the rate matching bandwidth to be the system bandwidth, rate matching component 712 can perform rate matching for the at least one channel around the resources indicated in the configuration for at least one of the reference signals (e.g., zero-power CSI-RS and/or non-zero-power CSI-RS) over the system bandwidth. Where rate matching component 712 determines the rate matching bandwidth to be the measurement bandwidth, rate matching component 712 can perform rate matching for the at least one channel around the resources indicated in the configuration for at least one of the reference signals over the measurement bandwidth without rate matching around the indicated resources over remaining system bandwidth that is outside of the measurement bandwidth.

In a specific example, where the RS configuration 780 may indicate a measurement bandwidth corresponding to the center 10 MHz of a 20 MHz system bandwidth, and where rate matching component 712 determines the rate matching bandwidth to be the system bandwidth, rate matching component 712 can rate match for the at least one channel around REs for at least the portion of the reference signals, as indicated in the configuration, over the 20 MHz system bandwidth and regardless of the 10 MHz measurement bandwidth. Where rate matching component 712 determines the rate matching bandwidth in this example to be the 10 MHz measurement bandwidth, rate matching component 712 can rate match for the at least one channel around REs for the reference signals over the center 10 MHz of the system bandwidth, while not performing rate matching around the REs (and thus including those REs indicated in the configuration) as configured for the reference signals in the outer 5 MHz portions of the system bandwidth.

In some examples, rate matching component 712 may determine to rate match around certain ones of the reference signal resources specified in the configuration over the rate matching bandwidth (e.g., rate match around zero-power reference signals and not non-zero-power reference signals, or vice versa).

Moreover, in an example, rate matching component 712 can determine the rate matching bandwidth differently for different instances of the reference signal. For example, rate matching component 712 may determine the rate matching bandwidth as the system bandwidth for rate matching the at least one channel around the zero-power reference signals and may determine the rate matching bandwidth as the measurement bandwidth for rate matching the at least one channel around the non-zero-power reference signals.

Further, in an example, rate matching component 712 may perform rate matching differently for different channels. For example, rate matching component 712 may rate match a data channel (e.g., PDSCH) around zero-power reference signal resources indicated in the configuration, while rate matching a control channel (e.g., EPDCCH) around both zero-power and non-zero-power reference signal resources indicated in the configuration.

In another example, rate matching component 712 may determine the rate matching bandwidth based on the configuration, such that where the configuration for the reference signal is not a DRS configuration, rate matching component 712 can determine the rate matching bandwidth to be the system bandwidth. As an example, described further with reference to FIG. 9 below, rate matching component 712 can rate match around the reference signal over the system bandwidth where the reference signal corresponds to a channel state information feedback configuration.

FIG. 9 illustrates an example method 900 for performing rate matching for at least one channel around at least resources related to zero-power reference signals (e.g., by a UE 702 operating a rate matching component 712). In method 900, blocks indicated as dashed boxes may represent optional steps.

Method 900 includes, at Block 902, receiving a DRS configuration identifying first resources related to NZP reference signals for DRS transmitted by a cell over a first bandwidth and second resources related to ZP reference signals for the DRS over a second bandwidth. RS configuration receiving component 710 can receive the DRS configuration (e.g., RS configuration 780) identifying the first resources related to NZP reference signals for DRS transmitted by the cell (e.g., eNB 704) over the first bandwidth and second resources related to ZP reference signals for the DRS over the second bandwidth. The first bandwidth may be less than or equal to (e.g., partially overlapping, overlapping and/or a subset of) the second bandwidth. Thus, for example, the first bandwidth may be the measurement bandwidth, which may be specified in the DRS configuration, and the second bandwidth may be the system bandwidth. In a specific example, in LTE, for a 20 MHz system bandwidth, the measurement bandwidth may include at least one of a 1.4 MHz, 3 MHz, 5 MHz, 10 MHz, 15 MHz, or 20 MHz bandwidth.

In an example, RS configuring component 720 can generate or otherwise determine the RS configuration for configurable reference signals, such as CSI-RS. The RS configuration can indicate resources (e.g., REs) for transmitting both NZP and for ZP CSI-RS. Moreover, the CSI-RS may correspond to DRS, and thus may not occupy the entire system bandwidth. Thus, in an example, RS configuring component 720 can generate the RS configuration to indicate the measurement bandwidth for the CSI-RS configured for DRS as well. Communicating component 602 can transmit the RS configuration 780 to the UE 702, in one example. DRS generating component 722 can generate the NZP CSI-RSs for DRS for transmission in the configured resources, and may cause communicating component 602 to blank communication on the configured ZP CSI-RSs.

Thus, method 900 may also include, at Block 904, receiving at least one channel from the cell along with an instance of the NZP reference signals and the ZP reference signals. Communicating component 661 can receive the at least one channel from the cell (e.g., from eNB 704) along with an instance of the NZP reference signals (e.g., transmitted by eNB 704) and the ZP reference signals (e.g., blanked by the eNB 704 but potentially transmitted by other eNBs). In either case, eNB 704 can have mapped the at least one channel around (e.g., not using) REs corresponding to the NZP and/or ZP reference signals. Accordingly, rate matching component 712 can rate match around the NZP and/or ZP reference signals to obtain the at least one channel. In a specific example in LTE, the at least one channel may correspond to a PDSCH or EPDCCH.

Method 900 may also include, at Block 906, performing rate matching for the at least one channel around the second resources over the second bandwidth. Rate matching component 712 can perform rate matching for the at least one channel around the second resources over the second bandwidth. In one example, rate matching component 712 can perform rate matching for the at least one channel around the second resources over the system bandwidth, which may be regardless of a measurement bandwidth specified in the RS configuration 780. Thus, communicating component 661 may perform measurements of the NZP CSI-RSs and/or ZP CSI-RSs (corresponding to CSI-RSs received from other eNBs or related cells) over the measurement bandwidth (e.g., the first bandwidth) while rate matching component 712 rate matches around the ZP CSI-RSs for DRS over the system bandwidth. Rate matching component 712, in one example, may not rate match around NZP CSI-RS configured for DRS by the eNB 704 (e.g., neither in the measurement bandwidth nor the system bandwidth).

Method 900 may optionally include, at Block 908, receiving a CSI feedback configuration identifying third resources related to NZP CSI-RS transmitted by the cell over the second bandwidth. RS configuration receiving component 710 can receive the CSI feedback configuration (e.g., as part of RS configuration 780 or otherwise) identifying third resources related to NZP CSI-RS transmitted by the cell (e.g., of eNB 704) over the second bandwidth (e.g., the system bandwidth). Thus, for example, the NZP CSI-RS related to CSI feedback may not correspond to DRS. In addition, the NZP CSI-RS related to CSI feedback may be transmitted in the same period of time (e.g., a same subframe) or different period of time than the CSI-RS configured for DRS.

In any case, performing rate matching at Block 906 may also optionally include, at Block 910, performing rate matching for the at least one channel around the third resources over the second bandwidth. Rate matching component 712 can perform rate matching for the at least one channel around the resources over the second bandwidth. Thus, in the example described above, rate matching component 712 can perform rate matching for the at least one channel (e.g., a PDSCH or EPDCCH in LTE) around REs indicated as relating to ZP CSI-RS and/or NZP CSI-RS configured for CSI feedback over the system bandwidth in the same or different subframe or other periods of time.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for rate matching around reference signaling, comprising:
   determining, via a processor, a measurement bandwidth configured for performing measurements of non-zero power channel state information reference signals (CSI-RS), wherein the measurement bandwidth is a subset of a system bandwidth centered, in frequency, at a center of the system bandwidth, wherein the measurement bandwidth is less than the system bandwidth, and wherein the system bandwidth is defined by consecutive subcarriers in a frequency domain;
   receiving, via a transceiver of a user equipment, a discovery reference signal (DRS) configuration, wherein the DRS configuration identifies, for the measurement bandwidth, first resources, less than all resources in the measurement bandwidth, to which non-zero power CSI-RS configured for DRS transmitted by a cell are mapped within the measurement bandwidth, wherein the DRS configuration further identifies, for the system bandwidth, second resources to which zero power CSI-RS are mapped within the system bandwidth;
   receiving, via the transceiver, at least one channel from the cell along with an instance of the non-zero power CSI-RS and the zero power CSI-RS; and
   performing, via a processor, rate matching for the at least one channel around the second resources over the system bandwidth.

2. The method of claim 1, further comprising receiving a channel state information (CSI) feedback configuration identifying third resources related to non-zero power CSI-RS transmitted by the cell over the system bandwidth, wherein performing the rate matching comprises performing the rate matching additionally around the third resources over the system bandwidth.

3. The method of claim 1, wherein the second bandwidth is configured by the cell.

4. The method of claim 3, wherein the system bandwidth is 20 megahertz (MHz), and the measurement bandwidth is at least one of 1.4 MHz, 3 MHz, 5 MHz, 10 MHz, 15 MHz, or 20 MHz.

5. The method of claim 1, wherein performing the rate matching further comprises performing the rate matching around the first resources over the measurement bandwidth.

6. The method of claim 1, wherein the at least one channel comprises at least one of a control channel or a data channel.

7. A user equipment for rate matching around reference signaling, comprising:
   a transceiver;
   at least one processor communicatively coupled with the transceiver via a bus for communicating signals in a wireless network; and
   a memory communicatively coupled with the at least one processor and/or the transceiver via the bus;
   wherein the at least one processor and the memory are operable to:
      determine a measurement bandwidth configured for performing measurements of non-zero power channel state information reference signals (CSI-RS), wherein the measurement bandwidth is a subset of a system bandwidth centered, in frequency, at a center of the system bandwidth, wherein the measurement bandwidth is less than the system bandwidth, and wherein the system bandwidth is defined by consecutive subcarriers in a frequency domain;
      receive, via the transceiver, a discovery reference signal (DRS) configuration, wherein the DRS configuration identifies, for the measurement bandwidth, first resources, less than all resources in the measurement bandwidth, to which non-zero power CSI-RS configured for DRS transmitted by a cell are mapped within the measurement bandwidth, wherein the DRS configuration further identifies, for the system bandwidth, second resources to which zero power CSI-RS are mapped within the system bandwidth;
      receive, via the transceiver, at least one channel from the cell along with an instance of the non-zero power CSI-RS and the zero power CSI-RS; and
      perform rate matching for the at least one channel around the second resources over the system bandwidth.

8. The user equipment of claim 7, wherein the at least one processor and the memory are further operable to receive a channel state information (CSI) feedback configuration identifying third resources related to non-zero power CSI-RS transmitted by the cell over the system bandwidth, wherein the at least one processor and the memory are operable to perform the rate matching at least in part by performing the rate matching additionally around the third resources over the system bandwidth.

9. The user equipment of claim 7, wherein the system bandwidth is configured by the cell.

10. The user equipment of claim 9, wherein the system bandwidth is 20 megahertz (MHz), and the measurement bandwidth is at least one of 1.4 MHz, 3 MHz, 5 MHz, 10 MHz, 15 MHz, or 20 MHz.

11. The user equipment of claim 7, wherein the at least one processor and the memory are operable to perform the rate matching at least in part by performing the rate matching around the first resources over the first bandwidth.

12. The user equipment of claim 7, wherein the at least one channel comprises at least one of a control channel or a data channel.

13. A user equipment for rate matching around reference signaling, comprising:
   means for determining a measurement bandwidth configured for performing measurements of non-zero power channel state information reference signals (CSI-RS), wherein the measurement bandwidth is a subset of a system bandwidth centered, in frequency, at a center of the system bandwidth, wherein the measurement bandwidth is less than the system bandwidth, and wherein the system bandwidth is defined by consecutive subcarriers in a frequency domain;

means for receiving a discovery reference signal (DRS) configuration, wherein the DRS configuration identifies, for the measurement bandwidth, first resources, less than all resources in the measurement bandwidth, to which non-zero power CSI-RS configured for DRS transmitted by a cell are mapped within the measurement bandwidth, wherein the DRS configuration further identifies, for the system bandwidth, second resources to which zero power CSI-RS are mapped within the system bandwidth;

means for receiving at least one channel from the cell along with an instance of the non-zero power CSI-RS and the zero power CSI-RS; and means for performing rate matching for the at least one channel around the second resources over the system bandwidth.

14. The user equipment of claim 13, further comprising means for receiving a channel state information (CSI) feedback configuration identifying third resources related to non-zero power CSI-RS transmitted by the cell over the system bandwidth, wherein the means for performing performs the rate matching additionally around the third resources over the system bandwidth.

15. The user equipment of claim 13, wherein the system bandwidth is configured by the cell.

16. The user equipment of claim 15, wherein the system bandwidth is 20 megahertz (MHz), and the measurement bandwidth is at least one of 1.4MHz, 3MHz, 5MHz, 10MHz, 15MHz, or 20MHz.

17. The user equipment of claim 13, wherein the at least one channel comprises at least one of a control channel or a data channel.

18. The user equipment of claim 13, wherein the means for performing performs the rate matching around the first resources over the measurement bandwidth.

19. A non-transitory computer-readable storage medium comprising computer-executable code for rate matching around reference signaling, the code comprising:

code for determining a measurement bandwidth configured for performing measurements of non-zero power channel state information reference signals (CSI-RS), wherein the measurement bandwidth is a subset of a system bandwidth centered, in frequency, at a center of the system bandwidth, wherein the measurement bandwidth is less than the system bandwidth, and wherein the system bandwidth is defined by consecutive subcarriers in a frequency domain;

code for receiving a discovery reference signal (DRS) configuration, wherein the DRS configuration identifies, for the measurement bandwidth, first resources, less than all resources in the measurement bandwidth, to which non-zero power CSI-RS configured for DRS transmitted by a cell are mapped within the measurement bandwidth, wherein the DRS configuration further identifies, for the system bandwidth, second resources to which zero power CSI-RS are mapped within the system bandwidth;

code for receiving at least one channel from the cell along with an instance of the non-zero power CSI-RS and the zero power CSI-RS; and code for performing rate matching for the at least one channel around the second resources over the system bandwidth.

20. The non-transitory computer-readable storage medium of claim 19, wherein the code further comprises code for receiving a channel state information (CSI) feedback configuration identifying third resources related to non-zero power CSI-RS transmitted by the cell over the system bandwidth, wherein the code for performing performs the rate matching additionally around the third resources over the system bandwidth.

21. The non-transitory computer-readable storage medium of claim 19, wherein the system bandwidth is configured by the cell.

22. The non-transitory computer-readable storage medium of claim 19, wherein the code for performing performs the rate matching around the first resources over the measurement bandwidth.

* * * * *